US008999050B2

(12) United States Patent
Ishida et al.

(10) Patent No.: US 8,999,050 B2
(45) Date of Patent: Apr. 7, 2015

(54) INK CONTAINING ANTHRAQUINONE BASED DYE, DYE USED IN THE INK, AND DISPLAY

(75) Inventors: Mio Ishida, Kanagawa (JP); Yasushi Shiga, Kanagawa (JP); Utako Takeda, Kanagawa (JP); Masami Kadowaki, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 13/608,569

(22) Filed: Sep. 10, 2012

(65) Prior Publication Data

US 2013/0241815 A1    Sep. 19, 2013

Related U.S. Application Data

(63) Continuation of application No. PCT/JP2011/055404, filed on Mar. 8, 2011.

(30) Foreign Application Priority Data

Mar. 9, 2010  (JP) .................... 2010-051815

(51) Int. Cl.
| | | |
|---|---|---|
| *C09D 11/00* | (2014.01) | |
| *G02B 26/00* | (2006.01) | |
| *C09D 11/52* | (2014.01) | |
| *C09B 1/28* | (2006.01) | |
| *C09D 7/00* | (2006.01) | |
| *G02F 1/167* | (2006.01) | |
| *C09D 11/033* | (2014.01) | |
| *C09D 11/037* | (2014.01) | |

(52) U.S. Cl.
CPC . *C09D 11/52* (2013.01); *C09B 1/28* (2013.01); *C09D 7/007* (2013.01); *G02B 26/00* (2013.01); *G02B 26/004* (2013.01); *G02B 26/005* (2013.01); *G02F 1/167* (2013.01); *C09D 11/033* (2013.01); *C09D 11/037* (2013.01); *G02F 2001/1678* (2013.01)

(58) Field of Classification Search
CPC ........ C09D 11/328; C09D 11/52; C09B 1/28; G02B 26/004; G02B 26/005
USPC ......... 106/31.44; 564/427; 345/107; 359/290
See application file for complete search history.

(56) References Cited

U.S. PATENT DOCUMENTS

| | | | | |
|---|---|---|---|---|
| 5,070,069 A | * | 12/1991 | Bradbury et al. | ............ 503/227 |
| 5,602,073 A | * | 2/1997 | Harada | ............ 503/227 |
| 5,935,901 A | * | 8/1999 | Shinozaki et al. | ........... 503/227 |
| 6,866,706 B2 | * | 3/2005 | Ishida et al. | ........... 106/31.47 |
| 7,297,729 B2 | | 11/2007 | Sexton et al. | |
| 7,800,816 B2 | | 9/2010 | Hayes et al. | |
| 8,143,382 B2 | * | 3/2012 | Shiga et al. | .................. 534/756 |
| 8,199,409 B2 | * | 6/2012 | Hayes et al. | ................. 359/665 |
| 8,747,537 B2 | * | 6/2014 | Shiga et al. | ................. 106/31.5 |
| 2010/0220380 A1 | * | 9/2010 | Hayes et al. | ................. 359/290 |
| 2011/0226998 A1 | * | 9/2011 | Van De Weijer-Wagemans et al. | ............................. 564/427 |
| 2013/0188238 A1 | * | 7/2013 | Shiga et al. | ............... 106/31.44 |

FOREIGN PATENT DOCUMENTS

| | | |
|---|---|---|
| CN | 1646644 A | 7/2005 |
| CN | 1942820 A | 4/2007 |
| JP | 60-151097 | 8/1985 |
| JP | 62-072781 | 4/1987 |
| JP | 1994-145571 A | 5/1994 |
| JP | 11-100523 | 4/1999 |
| JP | 2000-309171 | 11/2000 |
| JP | 2000-313174 | 11/2000 |
| JP | 2004-279537 A | 10/2004 |
| JP | 2005-521780 | 7/2005 |
| JP | 2007-531917 | 11/2007 |
| JP | 2008-164671 A | 7/2008 |
| JP | 2009-286832 | 12/2009 |
| JP | 2012-503056 A | 2/2012 |
| WO | WO 03/085055 | 10/2003 |
| WO | WO 2005/098524 | 10/2005 |
| WO | WO 2008/142086 A1 | 11/2008 |
| WO | WO 2010/031860 | 3/2010 |

OTHER PUBLICATIONS

Chinese Office Action issued May 22, 2013, in China Patent Application No. 201180012567.5 (with English Translation).
International Search Report issued Apr. 12, 2011 in PCT/JP2011/055404 filed Mar. 8, 2011.
Alfred G. Zielske; "(Tosyloxy)anthraquinones: Versatile Sythons for the Preparation of Various Aminoanthraquinones"; Journal of Organic Chemistry, 1987, vol. 52, No. 7, pp. 1305-1309.
K. Teramura, et al.; "Dyeing polyproplyene fibers. VII. Dyeing polypropylene fibers modified with nickel salts by means of mordant dyeing"; Sen'i Gakkaishi, 1965, vol. 21, No. 5, pp. 277-281.
Robert A. Hayes, et al.; "Video-speed electronic paper based on electrowetting"; Nature, 2003, vol. 425, pp. 383-385.
Chinese Office Action issued Jan. 22, 2014, in China Patent Application No. 201180012567.5 (with English Translation).
Information Offer Form (Third Party Observation), dated Mar. 18, 2014, filed in the corresponding Japanese Patent Application No. 2012-504478, with its English translation.
Notification for Reasons for Refusal issued Jan. 20, 2015, in Japanese Patent Application No. 2012-504478.

* cited by examiner

*Primary Examiner* — Helene Klemanski
(74) *Attorney, Agent, or Firm* — Oblon, McClelland, Maier & Neustadt, L.L.P.

(57) ABSTRACT

An object of the present invention is to provide an anthraquinone based dye having excellent solubility in a low polar solvent and having high absorption coefficient and high light resistance and an ink containing the same. The present invention relates to an ink comprising a specific anthraquinone based dye.

13 Claims, No Drawings

INK CONTAINING ANTHRAQUINONE BASED DYE, DYE USED IN THE INK, AND DISPLAY

TECHNICAL FIELD

The present invention relates to an anthraquinone based dye and an ink containing the dye, each of which is useful for display materials and the like.

BACKGROUND ART

In recent years, electro-optic displays of a new system having low electric power consumption and high visibility have been proposed and are being applied to electronic papers and the like. For example, an electrophoresis system is a system in which an image is displayed by impressing an electric field to a layer prepared by dispersing plural microcapsules including an oil based solvent and colored electrophoretic particles in a binder and thinly coating the dispersion and transferring the colored electrophoretic particles. In addition, an electrowetting system is a system in which an image is displayed by disposing plural pixels filled with two phases of an aqueous medium and an oil based coloring ink on a substrate, controlling the affinity at an interface between the aqueous medium and the oil based coloring ink for every pixel by ON-OFF of voltage impression, and spreading or gathering the oil based coloring ink on the substrate, and this system has a high response rate as compared with the electrophoresis system (Non-Patent Document 1).

Dyes to be used for such oil based inks of displays are required to have high solubility, high absorption coefficient, and high durability such as light resistance, etc. Patent Document 1 exemplifies Oil Blue N, Solvent Green, Sudan Red, and Sudan Black as dyes to be used for oil based inks of displays of an electrowetting system. Patent Document 2 discloses specified anthraquinone based dyes as a dye for dye transfer type thermal transfer recording.

PRIOR ART DOCUMENTS

Patent Documents

Patent Document 1: JP-T-2007-531917
Patent Document 2: JP-A-2000-313174

Non-Patent Documents

Non-Patent Document 1: Nature (GB), 2003, Vol. 425, p. 383-385

SUMMARY OF THE INVENTION

Problems to be Solved by the Invention

However, according to investigations made by the present inventors, it has become clear that the dyes which are specifically described in Patent Document 1 are needed to be more improved from the standpoints of solubility in a low polar solvent, absorption coefficient, light resistance, and the like. In addition, Patent Document 2 does not describe the application of the dyes to display materials.

An object of the present invention is to provide an anthraquinone based dye having excellent solubility in a low polar solvent and having high absorption coefficient and high light resistance and an ink containing the same.

Means for Solving the Problems

In order to solve the foregoing problems, the present inventors made extensive and intensive investigations. As a result, it has been found that an anthraquinone based dye having a certain kind of chemical structure has excellent solubility in a low polar solvent such as hydrocarbon based solvents, etc. and has high molar absorption coefficient and high light resistance. The present invention has been achieved on the basis of such knowledge.

Specifically, the gist of the present invention is as follows.
<1> An ink comprising an anthraquinone based dye represented by the following general formula (I) and a low polar solvent.

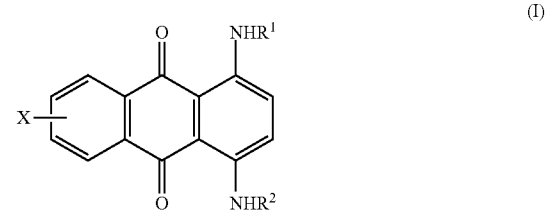

[In the general formula (I), X represents a hydrogen atom or a $COOR^3$ group; and each of $R^1$ to $R^3$ independently represents an optionally substituted alkyl group having a carbon number of from 1 to 20, provided that at least one of $R^1$ to $R^3$ is an optionally substituted branched-chain alkyl group having a carbon number of from 4 to 20, and the anthraquinone ring may have an arbitrary substituent other than X, $NHR^1$, and $NHR^2$.]

<2> The ink as set forth above in <1>, wherein the low polar solvent has a specific dielectric constant of not more than 2.2.
<3> The ink as set forth above in <1> or <2>, wherein the low polar solvent includes one or more members selected from the group consisting of hydrocarbon based solvents, fluorocarbon based solvents, and silicone oils.
<4> The ink as set forth above in any one of <1> to <3>, wherein the anthraquinone based dye is a dye represented by the following general formula (II).

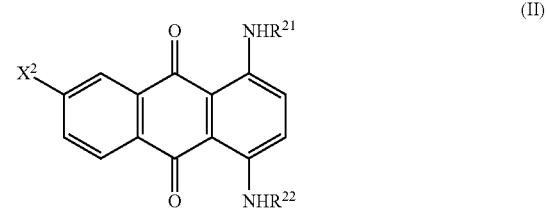

[In the general formula (II), $X^2$ represents a hydrogen atom or $COOR^{23}$; each of $R^{21}$ and $R^{22}$ independently represents an optionally substituted branched-chain alkyl group having a carbon number of from 4 to 20; and $R^{23}$ represents an optionally substituted alkyl group having a carbon number of from 1 to 20.]
<5> The ink as set forth above in any one of <1> to <4>, wherein in the anthraquinone based dye, when the dye is dissolved in n-decane, an absorption maximum wavelength in a wavelength region of from 350 to 750 nm falls within the range of from 600 to 720 nm, and a product $\epsilon C$ of a molar absorption coefficient $\epsilon$ (L mole$^{-1}$ cm$^{-1}$) at the absorption maximum wavelength and a concentration C (mole $L^{-1}$) of a saturated solution with the same solvent at room temperature (25° C.) is 500 ($cm^{-1}$) or more.

<6> The ink as set forth above in any one of <1> to <5>, which is for a display or optical shutter.

<7> A display, which comprises a display portion containing the ink as set forth above in any one of <1> to <6>, and which displays an image by controlling voltage impression in the display portion.

<8> The display as set forth above in <7>, wherein the display portion contains electrophoretic particles or an aqueous medium.

<9> The display as set forth above in <7> or <8>, wherein the image is displayed by changing a colored state by the voltage impression.

<10> The display as set forth above in any one of <7> to <9>, wherein the image is displayed by an electrowetting system or an electrophoresis system.

<11> An electronic paper comprising the display as set forth above in any one of <7> to <10>.

<12> An anthraquinone based dye which is used as an ink upon being dissolved in a low polar solvent and which is represented by the following general formula (I).

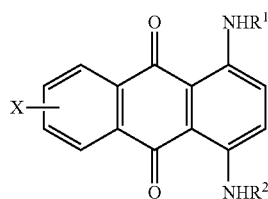

(I)

[In the general formula (I), X represents a hydrogen atom or a $COOR^3$ group; and each of $R^1$ to $R^3$ independently represents an optionally substituted alkyl group having a carbon number of from 1 to 20, provided that at least one of $R^1$ to $R^3$ is an optionally substituted branched-chain alkyl group having a carbon number of from 4 to 20, and the anthraquinone ring may have an arbitrary substituent other than X, $NHR^1$, and $NHR^2$.]

<13> The anthraquinone based dye as set forth above in <12>, wherein the low polar solvent has a specific dielectric constant of not more than 2.2.

<14> The anthraquinone based dye as set forth above in <12> or <13>, wherein the low polar solvent includes one or more members selected from the group consisting of hydrocarbon based solvents, fluorocarbon based solvents, and silicone oils.

<15> The anthraquinone based dye as set forth above in any one of <12> to <14>, wherein the anthraquinone based dye is a dye represented by the following general formula (II).

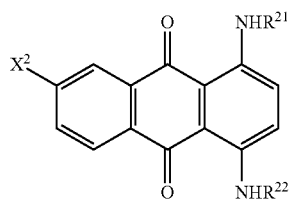

(II)

[In the general formula (II), $X^2$ represents a hydrogen atom or $COOR^{23}$; each of $R^{21}$ and $R^{22}$ independently represents an optionally substituted branched-chain alkyl group having a carbon number of from 4 to 20; and $R^{23}$ represents an optionally substituted alkyl group having a carbon number of from 1 to 20.]

<16> The anthraquinone based dye as set forth above in any one of <12> to <15>, wherein when the anthraquinone based dye is dissolved in n-decane, an absorption maximum wavelength in a wavelength region of from 350 to 750 nm falls within the range of from 600 to 720 nm, and a product εC of a molar absorption coefficient ε (L $mole^{-1}$ $cm^{-1}$) at the absorption maximum wavelength and a concentration C (mole $L^{-1}$) of a saturated solution with the same solvent at room temperature (25° C.) is 500 ($cm^{-1}$) or more.

<17> The anthraquinone based dye as set forth above in any one of <12> to <16>, wherein the ink is for a display or optical shutter.

Effects of the Invention

The anthraquinone based dye of the present invention having high molar absorption coefficient and high light resistance as well as high solubility in a low polar solvent, and therefore, an ink prepared by dissolving this in a low polar solvent is useful for applications in which visibility or durability is required. In particular, when used for displays in which displaying is electro-optically conducted, especially electrowetting displays, there is brought such an advantage that high visibility and durability can be realized.

In addition, an ink obtained by combining the anthraquinone dye of the present invention with other specified dyes has such an advantage that it may be formed as a favorable black ink having an excellent black hue and is also useful as a member functioning as an optical shutter.

MODES FOR CARRYING OUT THE INVENTION

Though representative embodiments for carrying out the present invention are hereunder specifically described, it should not be construed that the present invention is limited to the following embodiments so far as the gist thereof is not deviated, and the present invention can be carried out in various modifications.

In addition, in the present application, "% by mass", "ppm by mass", and "parts by mass" are synonymous with "% by weight", "ppm by weight", and "parts by weight", respectively.

(Anthraquinone Based Dye)

A dye having a chemical structure represented by the following general formula (I) is used as the anthraquinone based dye of the present invention.

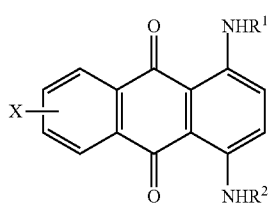

(I)

In the foregoing general formula (I), X represents a hydrogen atom or a $COOR^3$ group (here, $R^3$ is as follows). X is preferably a $COOR^3$ group. When X is a $COOR^3$ group, a long wavelength of the maximum absorption wavelength can be realized as compared with the case where X is a hydrogen atom. By adopting such a structure, the light in a long wavelength region of visible light can be efficiently absorbed, and therefore, in the case of mixing with red and yellow dyes to fabricate a black composition, a favorable black ink having an excellent black hue can be obtained.

In addition, each of $R^1$ to $R^3$ independently represents an optionally substituted alkyl group having a carbon number of from 1 to 20 (hereinafter also referred to as "C1 to C20"), and at least one of $R^1$ to $R^3$ is an optionally substituted branched-chain alkyl group of C4 to C20. Furthermore, the anthraquinone ring may have an arbitrary substituent other than X, $NHR^1$, and $NHR^2$.

In the definition of the substituents in the foregoing general formula (I), examples of the alkyl group of C1 to C20 include straight chain alkyl groups of C1 to C20, and preferably C1 to C10, such as a methyl group, an ethyl group, a propyl group, a butyl group, a pentyl group, a hexyl group, a heptyl group, an octyl group, a nonyl group, a decyl group, etc.; branched-chain alkyl groups of C3 to C20, and preferably C3 to C10, such as an isopropyl group, an isobutyl group, a sec-butyl group, a tert-butyl group, an isooctyl group, etc.; cyclic alkyl groups of C3 to C20, and preferably C3 to C10, such as a cyclopropyl group, a cyclobutyl group, a cyclopentyl group, a cyclohexyl group, a cyclopropylmethyl group, a cyclohexylmethyl group, a 4-butylmethylcyclohexyl group, etc.; and so on.

Examples of the branched-chain alkyl group of C4 to C20 include those selected among the foregoing branched-chain alkyl groups, with branched-chain alkyl groups of C4 to C10, such as a sec-butyl group, a tert-butyl group, an isooctyl group, etc., being preferable.

Each of the alkyl group of C1 to C20 and the branched-chain alkyl group of C4 to C20 may further have a substituent. From the viewpoint of solubility in a low polar solvent, such a substituent is preferably a substituent with low polarity. More specifically, examples thereof include halogen atoms such as a fluorine atom, a chlorine atom, a bromine atom, an iodine atom, etc.; alkoxy groups of C1 to C10, such as a methoxy group, an ethoxy group, a propoxy group, a butoxy group, an isobutoxy group, a sec-butoxy group, a tert-butoxy group, etc.; and so on.

Here, groups which are not specifically shown in the foregoing groups are selected through an arbitrary combination of the foregoing atoms and groups or in accordance with generally known common knowledge.

Furthermore, the anthraquinone ring in the general formula (I) may have an arbitrary substituent other than X, $NHR^1$, and $NHR^2$. Examples of such a substituent include halogen atoms such as a fluorine atom, a chlorine atom, a bromine atom, an iodine atom, etc.; alkyl groups of C1 to C10, such as a methyl group, an ethyl group, a propyl group, an isopropyl group, a butyl group, an isobutyl group, a sec-butyl group, a tert-butyl group, etc.; and so on.

The anthraquinone based dye having a chemical structure represented by the foregoing general formula (I) is preferably a compound having a chemical structure represented by the following general formula (II).

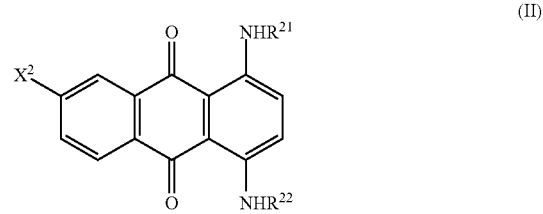

(II)

In the foregoing general formula (II), $X^2$ represents a hydrogen atom or a $COOR^{23}$ group (here, $R^{23}$ is as follows). $X^2$ is preferably a $COOR^{23}$ group. When $X^2$ is a $COOR^{23}$ group, a long wavelength of the maximum absorption wavelength can be realized as compared with the case where $X^2$ is a hydrogen atom. By adopting such a structure, the light in a long wavelength region of visible light can be efficiently absorbed, and therefore, in the case of mixing with red and yellow dyes to fabricate a black composition, a favorable black ink having an excellent black hue can be obtained.

In the general formula (II), each of $R^{21}$ and $R^{22}$ independently represents an optionally substituted branched-chain alkyl group of C4 to C20. $R^{23}$ represents an optionally substituted alkyl group of C1 to C20.

Specific groups and preferred groups of the branched-chain alkyl group of C4 to C20 in $R^{21}$ and $R^{22}$ and the alkyl group of C1 to C20 in $R^{23}$ in the general formula (II) are synonymous with those of the branched-chain alkyl group of C4 to C20 and the alkyl group of C1 to C20 in $R^1$ to $R^3$ in the general formula (I), respectively. In addition, specific groups and preferred groups of the substituent which such a substituent may have are also synonymous with those in the foregoing general formula (I), respectively.

Specific examples of the anthraquinone based dye represented by the foregoing general formula (I) or (II) are enumerated in the following formulae (1) to (8) (the respective specific examples will be hereunder also referred to as "Illustrative Compounds 1 to 8"). However, it should not be construed that the present invention is limited thereto so far as the gist thereof is not deviated.

Illustrative Compounds 1 to 8

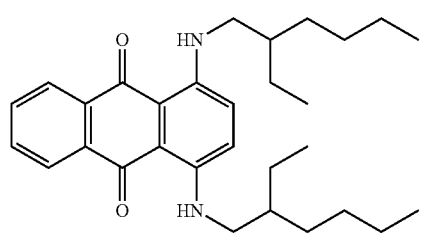

(1)

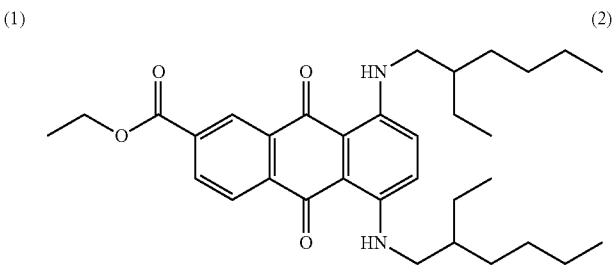

(2)

-continued

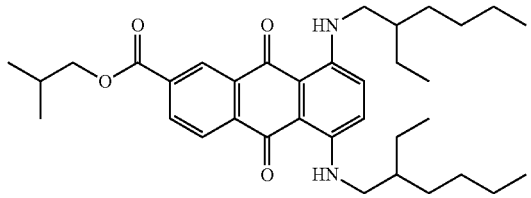
(3)

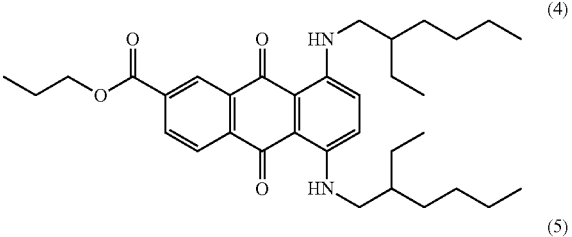
(4)

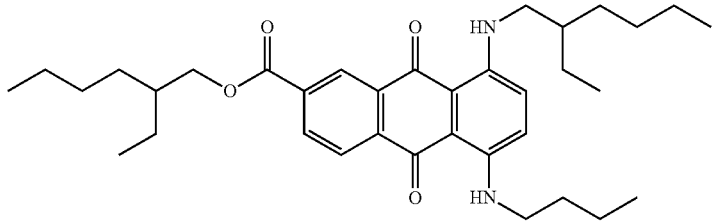
(5)

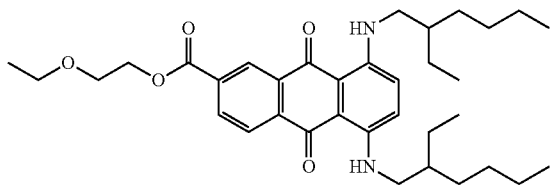
(6)

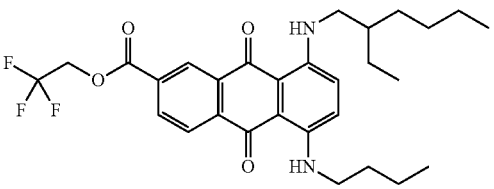
(7)

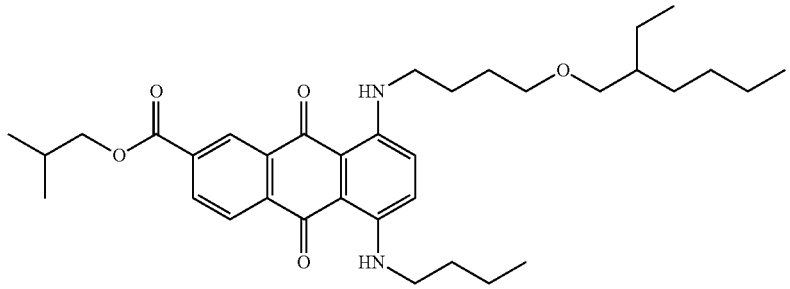
(8)

The compound having a chemical formula represented by the foregoing general formula (I), preferably the general formula (II) can be, for example, synthesized in conformity with a method described in JP-A-2000-313174.

The ink of the present invention may contain any one kind of the foregoing anthraquinone based dyes solely or may contain two or more kinds thereof in arbitrary combination and ratio.

From the standpoint of gram absorption coefficient, the anthraquinone based dye of the present invention which has been described above has a molecular weight of usually not more than 2,000, and preferably not more than 1,000 and usually 300 or more, and preferably 400 inclusive of a substituent in the case of having the substituent.

It is preferable that the anthraquinone based dye of the present invention has excellent solubility in a low polar solvent, especially solubility in a hydrocarbon based solvent.

A solubility of the anthraquinone based dye of the present invention in n-decane at room temperature (25° C.) is usually 1% by mass or more, preferably 2% by mass or more, more preferably 3% by mass or more, and most preferably 4.5% by mass or more. Though it is preferable that the solubility is high as far as possible, it is usually not more than about 80% by mass.

A solubility of the anthraquinone based dye of the present invention in tetradecane at room temperature (25° C.) is usually 1% by mass or more, preferably 2% by mass or more, more preferably 3% by mass or more, and most preferably 4.5% by mass or more. Though it is preferable that the solubility is high as far as possible, it is usually not more than about 80% by mass.

A solubility of the anthraquinone based dye of the present invention in ISOPAR M at room temperature (25° C.) is usually 1% by mass or more, preferably 2% by mass or more, more preferably 3% by mass or more, and most preferably 4% by mass or more. Though it is preferable that the solubility is high as far as possible, it is usually not more than about 80% by mass.

A solubility of the anthraquinone based dye of the present invention in ISOPAR G at room temperature (25° C.) is usually 1% by mass or more, preferably 3% by mass or more, more preferably 4% by mass or more, and most preferably 5% by mass or more. Though it is preferable that the solubility is high as far as possible, it is usually not more than about 80% by mass.

A solubility of the anthraquinone based dye of the present invention in decalin at room temperature (25° C.) is usually 1% by mass or more, preferably 3% by mass or more, more preferably 5% by mass or more, and most preferably 7% by mass or more. Though it is preferable that the solubility is high as far as possible, it is usually not more than about 80% by mass.

In view of the fact that the solubility of the dye in a low polar solvent is high, when an ink having the dye dissolved in a low polar solvent is applied to a display or the like, high visibility is obtainable.

Incidentally, in the case of use for an electrowetting display, taking into consideration a principle thereof, it is desirable that the anthraquinone based dye of the present invention is water-insoluble. The term "water-insoluble" as referred to herein means that a solubility thereof in water under a condition at 25° C. and 1 atmosphere is not more than 0.1% by mass, and preferably not more than 0.01% by mass.

In addition, the anthraquinone based dye of the present invention usually assumes a blue color tone. That is, in the case where the dye is dissolved in a low polar solvent, an absorption maximum wavelength in a wavelength region of from 350 to 750 nm falls preferably within the range of from 600 to 720 nm, more preferably within the range of from 640 to 700 nm, still more preferably within the range of from 655 to 700 nm, and most preferably within the range of from 660 to 700 nm. Specifically, in the case where the dye is dissolved in n-decane, an absorption maximum wavelength in a wavelength region of from 350 to 750 nm falls preferably within the range of from 600 to 720 nm, more preferably within the range of from 655 to 700 nm, still more preferably within the range of from 655 to 700 nm, and most preferably within the range of from 660 to 700 nm.

Furthermore, in the anthraquinone based dye of the present invention, when the dye is dissolved in n-decane, a value of a product $\epsilon C$ of a molar absorption coefficient $\epsilon$ (L mole$^{-1}$ cm$^{-1}$) of the solution at the absorption maximum wavelength and a concentration C (mole L$^{-1}$) of a saturated solution with the same solvent at room temperature (25° C.) is usually 500 (cm$^{-1}$) or more, preferably 800 (cm$^{-1}$) or more, more preferably 1,000 (cm$^{-1}$) or more, and still more preferably 1,200 (cm$^{-1}$) or more. It is preferable that the $\epsilon C$ value is high as far as possible, and an upper limit thereof is not particularly specified. However, it is usually not more than 40,000 (cm$^{-1}$).

In view of the fact that the molar absorption coefficient and the $\epsilon C$ value are high, when an ink having the dye dissolved in a low polar solvent is applied to a display or the like, high visibility is obtainable.

Though a concentration of the anthraquinone based dye in the ink of the present invention is arbitrarily adjusted depending upon a purpose thereof, it is usually 1% by weight or more and usually not more than 80% by weight. For example, in the case where the anthraquinone based dye of the present invention is used as a blue dye for displays or optical filters, it is used upon being dissolved or dispersed in a low polar solvent depending upon the required $\epsilon C$ value. Its concentration is usually 1% by weight or more, preferably 3% by weight or more, and more preferably 5% by weight or more. Though it is preferable that the concentration is high as far as possible, it is usually not more than about 80% by weight.

In view of the fact that the anthraquinone based dye of the present invention has excellent solubility in a low polar solvent and has high absorption coefficient and high light resistance, it can be preferably applied as an ink prepared by being dissolved or dispersed in a low polar solvent for display materials, in particular electrowetting display materials. In addition, an ink prepared through combination with other dye can also be preferably applied for optical shutter materials.

(Low Polar Solvent)

Though the low polar solvent which is used in the present invention is not particularly limited so far as it has low polarity, for example, a specific dielectric constant thereof is preferably not more than 2.2, more preferably not more than 2.1, and still more preferably not more than 2.0. Though a lower limit of the specific dielectric constant is not particularly limited, it is suitable that the lower limit of the specific dielectric constant is usually 1.5 or more, and preferably 1.8 or more.

Specific examples of the low polar solvent include hydrocarbon based solvents, fluorocarbon based solvents, silicone oils, higher fatty acid esters, and so on.

Examples of the hydrocarbon based solvent include straight chain or branched-chain aliphatic hydrocarbons, alicyclic hydrocarbons, aromatic hydrocarbons, petroleum naphthas, and so on. Of these, aliphatic hydrocarbon based solvents are especially preferable as the solvent from the standpoints of physical property values such as density, melting point, boiling point, viscosity, surface tension, specific dielectric constant, optical characteristic, etc. and behavior of electrowetting. Examples of the aliphatic hydrocarbon based solvent include aliphatic hydrocarbon based solvents such as n-decane, isodecane, decalin, nonane, dodecane, isodecane, tetradecane, hexadecane, isoalkanes, etc.; and examples of commercially available products thereof include ISOPAR E, ISOPAR G, ISOPAR H, ISOPAR L, and ISOPAR M (all of which are manufactured by Exxon Mobil Corporation), IP SOLVENT (manufactured by Idemitsu Petrochemical Co., Ltd.), SOLTROL (manufactured by Phillips Petroleum Company), and so on. Examples of the aromatic hydrocarbon based solvent include HISOL (manufactured by Nippon Oil Company, Ltd.) and so on. Examples of the petroleum naphtha based solvent include SHELL S.B.R., SHELL SOL 70, and SHELL SOL 71 (all of which are manufactured by Shell Petrochemicals Company Limited), PEGASOL (manufactured by Exxon Mobil Corporation), and so on.

The fluorocarbon based solvent is a hydrocarbon chiefly substituted with fluorine, and examples thereof include perfluoroalkanes represented by $C_nF_{2n+2}$ such as $C_7F_{16}$, $C_8F_{18}$, etc. (e.g., "FLUORINERT PF5080" and "FLUORINERT PF5070" (trade names), all of which are manufactured by Sumitomo 3M Limited, etc.), fluorine based inert liquids (e.g., "FLUORINERT FC Series" (trade names), manufactured by Sumitomo 3M Limited, etc.), fluorocarbons (e.g., "KRYTOX GPL Series" (trade names), manufactured by DuPont Japan Limited, etc.), freons (e.g., "HCFC-141b" (trade name), manufactured by Daikin Industries, Ltd., etc.), iodinated fluorocarbons such as $F(CF_2)_4CH_2CH_2I$, $F(CF_2)_6I$, etc. (e.g., "I-1420" and "I-1600" (trade names), all of which are manufactured by Daikin Fine Chemical Laboratory Co., Ltd., etc.), and so on.

Examples of the silicone oil include low-viscosity synthetic dimethyl polysiloxanes; and examples of commercially available products thereof include KF96L (trade name), manufactured by Shin-Etsu Silicone Co., Ltd., SH200 (trade name), manufactured by Dow Corning Toray Co., Ltd., and so on.

These low polar solvents can be used solely or in admixture.

In the present invention, the low polar solvent preferably includes one or more members selected from the group consisting of hydrocarbon based solvents, fluorocarbon based solvents, and silicone oils. A content of such a material is usually 50% or more, preferably 70% or more, and more preferably 90% or more of the low polar solvent.

Above all, preferably, the low polar solvent includes a hydrocarbon based solvent, and especially preferably, the low polar solvent includes an aliphatic hydrocarbon based solvent.

Though a viscosity of the low polar solvent of the present invention is not particularly limited, it is usually 1.0 cP or more, and preferably 1.2 cP or more at 30° C. In addition, an upper limit thereof is usually 10.00 cP.

A surface tension of the low polar solvent of the present invention is usually 5 mN·m$^{-1}$ or more, preferably 10 mN·m$^{-1}$ or more, and more preferably 15 mN·m$^{-1}$ or more. In addition, an upper limit thereof is usually 50 mN·m$^{-1}$.

In the present invention, from the viewpoint of effects, it is preferable that the low polar solvent does not contain water or a polar solvent in the solvent. However, the low polar solvent may be mixed with other polar solvent and used within range where the effects of the present invention are not impaired.

The ink of the present invention contains the low polar solvent and the anthraquinone based dye, and it is obtained by dissolving the anthraquinone based dye and optionally other dye or an additive or the like in the low polar solvent.

With respect to the term "dissolving" as referred to herein, it is not always required that the anthraquinone based dye is completely dissolved in the low polar solvent. A state where not only the solution having the anthraquinone based dye dissolved in the low polar solvent passes through a filter of about 0.1 microns, but the absorption coefficient is measurable may be adopted, and a state where fine particles of the dye are dispersed may also be adopted.

(Other Dye)

The ink of the present invention may contain, in addition to the foregoing anthraquinone based dye, other dye for the purpose of attaining a desired color tone. For example, a black color can be revealed by mixing the anthraquinone based dye of the present invention with red and yellow dyes.

As other dye which the ink of the present invention may contain, it is possible to arbitrarily select a dye among dyes having solubility and dispersibility in a medium to be used within the range where the effects of the present invention are not impaired.

In the case where the ink of the present invention is used as a display material or an optical shutter material, an arbitrary dye can be selected and used as other dye among those which are soluble in the low polar solvent such as aliphatic hydrocarbon based solvents, etc. Specific examples thereof include Oil Blue N (alkylamine-substituted anthraquinone), Solvent Green, Solvent Blue, Sudan Blue, Sudan Red, Sudan Yellow, Sudan Black, and so on. These dyes per se are already-known and can be obtained as commercially available products.

In addition, as other dye which the ink of the present invention may contain, pyrazole diazo based dyes, alkylamine-substituted anthraquinone based dyes, and heterocyclic azo dyes are preferable, and a preferred black ink can be realized through an arbitrary combination with these dyes.

Furthermore, the ink of the present invention may contain an arbitrary additive as the need arises, or suitable for each application within the range where the effects of the present invention are not impaired.

(Physical Properties of Ink)

An absolute value of a rate of change ($|\{Vi-Vs\}/Vi \times 100|$) between a viscosity (Vs) of a low polar solvent and a viscosity (Vi) of the ink of the present invention having the dye dissolved in the low polar solvent relative to the viscosity of the ink is usually not more than 40%, preferably not more than 20%, more preferably not more than 10%, and still more preferably not more than 9% at 30° C. Since the viscosity of the ink of the present invention is not largely different from the viscosity of the low polar solvent, there is brought such an advantage that even when the concentration of the dye is scattered, the change of the viscosity is small, and influences against the drive characteristic are small. Incidentally, though the viscosity is not particularly limited so far as it is measured by a known method, for example, it can be measured by a digital viscometer.

An absolute value of a rate of change ($|\{Ti-Ts\}/Ti \times 100|$) between a surface tension (Ts) of a low polar solvent and a surface tension (Ti) of the ink of the present invention having the dye dissolved in the low polar solvent relative to the surface tension of the ink is usually not more than 7.0%, preferably not more than 5.0%, more preferably not more than 3.0%, and still more preferably not more than 2.0%. Since the surface tension of the ink of the present invention is not largely different from the surface tension of the low polar solvent, there is brought such an advantage that even when the concentration of the dye is scattered, the change of the surface tension is small, and influences against the drive characteristic are small. Incidentally, though the surface tension is not particularly limited so far as it is measured by a known method, for example, it can be measured at a temperature of 20° C. at a bubble generation frequency of 1 Hz by a bubble pressure dynamic surface tension meter.

An absolute value of a rate of change ($|\{Pi-Ps\}/Pi \times 100|$) between a specific dielectric constant (Ps) of a low polar solvent and a specific dielectric constant (Pi) of the ink of the present invention having the dye dissolved in the low polar solvent relative to the specific dielectric constant of the ink is usually not more than 19%, preferably not more than 17%, more preferably not more than 15.0%, still more preferably not more than 10.0%, and most preferably not more than 5.0%. Since the specific dielectric constant of the ink of the present invention is not largely different from the specific dielectric constant of the low polar solvent, there is brought such an advantage that even when the concentration of the dye is scattered, the change of the specific dielectric constant is small, and influences against the drive characteristic are small. Incidentally, though the specific dielectric constant is not particularly limited so far as it is measured by a known method, for example, it can be determined in the following manner. That is, a measurement subject is interposed between ITO electrode-equipped glass substrates as parallel plates opposing to each other at an electrode interval of 30 μm and then measured for an equivalent parallel capacitance at the time of impressing a test signal voltage of 0.1 V at a measuring frequency of 1 kHz, followed by calculation according to the following expression.

Specific dielectric constant=(Equivalent parallel capacitance)×(Electrode interval)/(Electrode area)/(Dielectric constant of vacuum($\epsilon_0$))

(Application)

Though the ink of the present invention is not particularly limited with respect to an application thereof, it is preferably used as an ink for displays.

The display of the present invention has a display portion including the ink of the present invention and displays an image by controlling the voltage impression in this display portion. In addition, the display portion may be divided into a pixel unit. Preferably, the image is displayed by changing a colored state of the display portion by the voltage impression. A display of an electrowetting system or an electrophoresis system is preferable.

In the case of an electrowetting system, the ink of the present invention can be used in a state of being separated from or coexistent with an aqueous medium, and the display portion can be formed as one including an aqueous medium. The electrowetting system is a system in which an image is displayed by disposing plural pixels filled with two phases of an aqueous medium and an oil based coloring ink on a substrate, controlling the affinity at an interface between the aqueous medium and the oil based coloring ink for every pixel by ON-OFF of voltage impression, and spreading or gathering the oil based coloring ink on the substrate. In particular, the ink of the present invention can be suitably used as the oil based coloring ink.

In the case of an electrophoresis system, electrophoretic particles can be used in a state of being dispersed in the ink of the present invention, and the display portion can be formed as one including electrophoretic particles. The electrophoresis system is a system in which an image is displayed by impressing an electric field to a layer prepared by dispersing plural microcapsules including an oil based solvent and colored electrophoretic particles in a binder and thinly coating the dispersion and transferring the colored electrophoretic particles. The ink of the present invention can be suitably used as the oil based solvent.

Examples of the application of the display of the present invention include various applications for computers, electronic papers, electronic inks, and the like, and there is a possibility that the display of the present invention can replace almost all of the existing applications of liquid crystal displays. Above all, the ink of the present invention is especially preferable as an ink for electrowetting displays.

In addition, the ink of the present invention has such an advantage that it may be formed as a favorable black ink having an excellent black hue, and in particular, it is also useful as a member functioning as an optical shutter.

EXAMPLES

The present invention is hereunder specifically described by reference to Examples and Comparative Examples, but it should be construed that the present invention is not limited to the following Examples at all.

<Dye>

Illustrative Compounds 1 to 4 represented by the foregoing formulae (1) to (4) were synthesized in conformity with a method described in Manufacturing Example 1 of JP-A-2000-313174.

For comparison, a product of Tokyo Chemical Industry Co., Ltd. was used as Comparative Compound 1 (C.I. Solvent Blue 11) represented by the following formula (i). In addition, Comparative Compound 2 represented by the following formula (ii) is Compound No. 4 described in Japanese Patent No. 3719298, and it was synthesized by a method described in the same patent document. Comparative Compound 3 represented by the following formula (iii) is Compound No. 28 described in JP-A-02-241784, and it was synthesized by a method described in the same patent document. Comparative Compound 4 represented by the following formula (iv) is Compound M-2 described in JP-A-01-136787, and it was synthesized by a method described in the same patent document.

(Comparative Compounds 1 to 4)

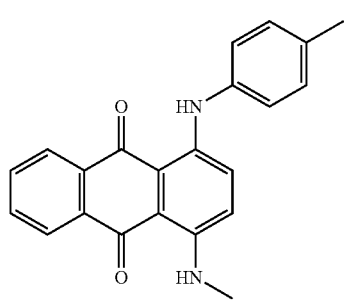

(i)

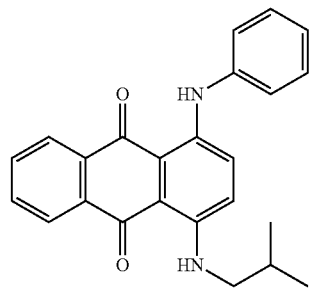

(ii)

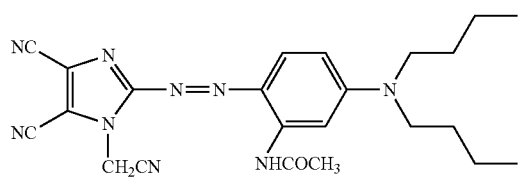

(iii)

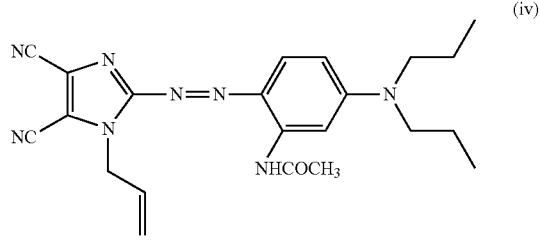

(iv)

<Solvent>

Products of Tokyo Chemical Industry Co., Ltd. were used for n-decane and tetradecane, respectively. Products of Exxon Mobil Corporation were used for ISOPAR M and ISOPAR G, respectively. A product of Kanto Chemical Co., Inc. was used for decalin. A product of Junsei Chemical Co., Ltd. was used for xylene.

<Preparation and Evaluation of Solubility of Ink>

Each of Illustrative Compounds 1 to 4 and Comparative Compounds 1, 2 and 4 was dissolved in each of the solvents of n-decane, tetradecane, ISOPAR M, and ISOPAR G, thereby preparing an ink. On that occasion, the solubility of each of the compounds in each of the solvents was measured in the following manner.

Each of the compounds (dyes) was added to each of the solvents until a dissolution residue was generated, and the contents were ultrasonically treated at a water temperature of 30° C. for 30 minutes. After standing at room temperature for 12 hours, the resultant was subjected to centrifugal filtration with a 0.1 μm filter by using an ultrasmall-sized centrifuge (centrifugal force: 5,200×g). Each of the obtained saturated solutions was diluted with an appropriate concentration, a solubility of each of the dyes was calculated from a relation with a previously measured absorption coefficient, and a product $\epsilon C$ (cm$^{-1}$) of a molar absorption coefficient $\epsilon$ (L mole$^{-1}$ cm$^{-1}$) at the absorption maximum wavelength and a concentration C (mole L$^{-1}$) of the saturated solution was determined. The measurement results are shown in Tables 1 to 5.

TABLE 1 n-Decane solution

| Dye | Color tone | Absorption maximum wavelength (nm) | Solubility (% by mass) | εC (cm$^{-1}$) |
|---|---|---|---|---|
| Illustrative Compound 1 | Blue | 650 | 6.6 | 2000 |
| Illustrative Compound 2 | Blue | 668 | 4.7 | 1000 |
| Illustrative Compound 3 | Blue | 668 | 7.5 | 1900 |
| Illustrative Compound 4 | Blue | 668 | 9.5 | 2400 |
| Comparative Compound 1 | Colorless | Unmeasurable | Low | Low |
| Comparative Compound 2 | Blue | 614 | 0.7 | 200 |
| Comparative Compound 4 | Colorless | Unmeasurable | Low | Low |

TABLE 2

Tetradecane solution

| Dye | Color tone | Absorption maximum wavelength (nm) | Solubility (% by mass) | εC (cm$^{-1}$) |
|---|---|---|---|---|
| Illustrative Compound 1 | Blue | 651 | 5.7 | 1600 |
| Illustrative Compound 3 | Blue | 668 | 4.7 | 1200 |
| Illustrative Compound 4 | Blue | 668 | 4.9 | 1300 |
| Comparative Compound 1 | Blue | 595 | 0.04 | 12 |
| Comparative Compound 4 | Colorless | Unmeasurable | Low | Low |

TABLE 3

ISOPAR M solution

| Dye | Color tone | Absorption maximum wavelength (nm) | Solubility (% by mass) | εC (cm$^{-1}$) |
|---|---|---|---|---|
| Illustrative Compound 1 | Blue | 650 | 4.2 | 1200 |
| Illustrative Compound 3 | Blue | 668 | 5.1 | 1400 |
| Illustrative Compound 4 | Blue | 667 | 4.5 | 1200 |
| Comparative Compound 1 | Blue | 594 | 0.02 | 7 |
| Comparative Compound 4 | Colorless | Unmeasurable | Low | Low |

TABLE 4

ISOPAR G solution

| Dye | Color tone | Absorption maximum wavelength (nm) | Solubility (% by mass) | εC (cm$^{-1}$) |
|---|---|---|---|---|
| Illustrative Compound 1 | Blue | 649 | 7.3 | 1900 |
| Illustrative Compound 3 | Blue | 667 | 10.8 | 2700 |
| Illustrative Compound 4 | Blue | 666 | 5.5 | 1400 |
| Comparative Compound 1 | Blue | 594 | 0.02 | 7 |
| Comparative Compound 4 | Colorless | Unmeasurable | Low | Low |

TABLE 5

Decalin solution

| Dye | Color tone | Absorption maximum wavelength (nm) | Solubility (% by mass) | εC (cm$^{-1}$) |
|---|---|---|---|---|
| Illustrative Compound 1 | Blue | 645 | 9.98 | 3400 |
| Illustrative Compound 3 | Blue | 662 | 10.0 | 3100 |
| Comparative Compound 1 | Blue | 636 | 0.07 | 26 |
| Comparative Compound 4 | Red | 520 | 0.01 | 7 |

As compared with the Comparative Compounds, the Illustrative Compounds (dyes) of the present invention exhibited not only high solubility in each of the solvents of n-decane, tetradecane, ISOPAR G and ISOPAR M but a high εC value.

It was proven from this matter that since the anthraquinone based dye of the present invention has high solubility in a low polar solvent and has high molar absorption coefficient and high εC, when an ink prepared by dissolving this in a low polar solvent is applied to a display or the like, high visibility is obtainable.

Incidentally, as compared with Illustrative Compound 1, Illustrative Compounds 2 to 4 realize a long wavelength of the maximum absorption wavelength. Illustrative Compounds 2 to 4 are more preferable because in view of the fact that each of these compounds has an ester structure within a molecule and at a specified position, it is able to efficiently absorb the light in a long wavelength region of visible light, and therefore, in the case of mixing with red and yellow dyes to fabricate a black composition, a favorable black ink having an excellent black hue can be obtained. When such an ink is applied to a member functioning as a display or an optical shutter, high light shielding properties are obtained, and hence, such is more preferable.

<Light Resistance Test>

The light resistance of each of the compounds (dyes) was measured in the following manner.

1 mg of each of the compounds (dyes) was dissolved in 200 mL of each of the low polar solvents within a container, thereby preparing an ink. This ink was irradiated with light for 2 hours by using a photoreactor UVL-400HA (400 W high pressure mercury vapor lamp), manufactured by Riko Kagaku Sangyo K.K. During that interval, the container was cooled with a coolant, thereby keeping an internal temperature at from 10 to 30° C. A residual rate of the dye was determined by calculation according to the following expression, thereby evaluating the light resistance. The results are shown in Table 6.

Residual rate=(Absorbance at the maximum absorption wavelength after irradiation)/(Absorbance at the maximum absorption wavelength before irradiation)

TABLE 6

Residual rate after light resistance test

| Dye | n-Decane | Tetradecane | ISOPAR M | ISOPAR G |
|---|---|---|---|---|
| Illustrative Compound 3 | 78% | 94% | 77% | 88% |
| Illustrative Compound 4 | 97% | 93% | 99% | 95% |
| Comparative Compound 3 | 45% | Not measured | Not measured | Not measured |

It is noted from Table 6 that in the case of using each of Illustrative Compounds 3 and 4 and each of the low polar solvent, high light resistance is revealed.

It was proven from this matter that since the anthraquinone based dye of the present invention has also high light resistance, when an ink prepared by dissolving this in a low polar solvent is applied to a display or the like, high visibility and durability are obtainable.

<Preparation of Oil Ink>

Oil Inks 1 to 5 and Comparative Oil Ink 1 were prepared by dissolving a dye in a low polar solvent in a composition shown in Table 7. In all of the compositions, the dye was completely dissolved in the low polar solvent.

TABLE 7

Preparation of oil ink

| | Dye | Solvent | Amount of solvent (g) | Amount of dye (g) | Concentration (% by weight) |
|---|---|---|---|---|---|
| Oil Ink 1 | Illustrative Compound 3 | n-Decane | 15 | 0.79 | 5.0 |
| Oil Ink 2 | Illustrative Compound 3 | Tetradecane | 15 | 0.79 | 5.0 |
| Oil Ink 3 | Illustrative Compound 3 | ISOPAR M | 15 | 0.79 | 5.0 |
| Oil Ink 4 | Illustrative Compound 3 | ISOPAR G | 15 | 0.79 | 5.0 |
| Oil Ink 5 | Illustrative Compound 3 | Decalin | 15 | 0.79 | 5.0 |
| Comparative Oil Ink 1 | Illustrative Compound 3 | Xylene | 15 | 0.79 | 5.0 |

<Measurement of Viscosity>

A viscosity of each of Oil Inks 2 to 5 was measured using a digital viscometer DV-I+, manufactured by BROOKFIELD. During that interval, the temperature was kept constant using a Coolnics circulator CTE42A, manufactured by YAMATO-KOMATSU. The results are shown in Table 8.

TABLE 8

Measurement results of viscosity

| | Viscosity/cP | | | | Absolute value of a rate of change (%) between viscosity (Vs) of solvent and viscosity (Vi) of oil ink relative to viscosity of oil ink ($|\{Vi - Vs\}/Vi \times 100|$) | |
|---|---|---|---|---|---|---|
| | Reference (solvent only) | | Oil ink solvent + dye | | | |
| | 15° C. | 30° C. | 15° C. | 30° C. | 15° C. | 30° C. |
| Oil Ink 2 | 3.08 | 2.62 | 3.59 | 2.41 | 14.2 | 8.7 |
| Oil Ink 3 | 5.72 | 3.61 | 5.42 | 3.66 | 5.5 | 1.4 |
| Oil Ink 4 | 1.20 | 1.35 | 1.74 | 1.34 | 31.0 | 0.7 |
| Oil Ink 5 | 3.16 | 2.73 | 3.62 | 2.97 | 12.7 | 8.1 |

It was proven from Table 8 that in the case of Oil Inks 2 to 5, namely in the oil inks prepared using the low polar solvent of the present invention, the change of the viscosity is small, and adverse influences against the drive characteristic are small, as compared with the case of only each of the solvents. Incidentally, in Comparative Oil Ink 1, the viscosity was too low, so that it exceeded a measuring limit of the measurement instrument.

<Measurement of Surface Tension>

A surface tension of each of Oil Inks 1 to 5 was measured at a temperature of 20° C. at a bubble generation frequency of 1 Hz by using a bubble pressure dynamic surface tension meter BP-2, manufactured by KRUSS. The results are shown in Table 9.

TABLE 9

Measurement results of surface tension

| | Surface tension at 1 Hz (mN·m$^{-1}$) | | Absolute value of a rate of change (%) between surface tension (Ts) of solvent and surface tension (Ti) of oil ink relative to surface tension of oil ink ($|\{Ti - Ts\}/Ti \times 100|$) |
|---|---|---|---|
| | Reference (solvent only) | Oil ink (solvent + dye) | |
| Oil Ink 1 | 24.4 | 24.1 | 1.2 |
| Oil Ink 2 | 26.6 | 26.8 | 0.8 |
| Oil Ink 3 | 25.6 | 25.1 | 2.0 |
| Oil Ink 4 | 22.9 | 22.9 | 0.0 |
| Oil Ink 5 | 32.2 | 32.2 | 0.0 |

It was proven from Table 9 that in the case of Oil Inks 1 to 5, namely in the oil inks prepared using the low polar solvent of the present invention, the change of the surface tension is small, and adverse influences against the drive characteristic are small, as compared with the case of only each of the solvents.

<Measurement of Specific Dielectric Constant>

A specific dielectric constant of each of Oil Inks 1 to 5 and Comparative Oil Ink 1 was measured using a precision LCR meter 4284A, manufactured by Agilent Technologies, Inc. by the impedance meter method. Each of the oil inks was interposed between ITO electrode-equipped glass substrates as parallel plates opposing to each other at an electrode interval of 30 μm and then measured for an equivalent parallel capacitance at the time of impressing a test signal voltage of 0.1 V at a measuring frequency of 1 kHz, followed by being calculated according to the following expression for determining and evaluating the specific dielectric constant. The results are shown in Table 10.

Specific dielectric constant=(Equivalent parallel capacitance)×(Electrode interval)/(Electrode area)/(Dielectric constant of vacuum($\epsilon_0$))

TABLE 10

Measurement results of specific dielectric constant

| | Surface tension specific dielectric constant at 1 kHz | | Absolute value of a rate of change (%) between specific dielectric constant (Ps) of solvent and specific dielectric constant (Pi) of oil ink |
|---|---|---|---|
| | Reference (solvent only) | Oil ink (solvent + dye) | relative to specific dielectric constant of oil ink (|{Pi − Ps}/Pi × 100|) |
| Oil Ink 1 | 2.0 | 2.0 | 0.0 |
| Oil Ink 2 | 2.0 | 2.1 | 4.8 |
| Oil Ink 3 | 2.0 | 2.1 | 4.8 |
| Oil Ink 4 | 1.8 | 2.1 | 14 |
| Oil Ink 5 | 1.9 | 2.3 | 17 |

It was proven from Table 10 that in the case of Oil Inks 1 to 5, namely in the oil inks prepared using each of the low polar solvents of the present invention, the change of the specific dielectric constant is small, and adverse influences against the drive characteristic are small.

Incidentally, in the case of Comparative Oil Ink 1, namely in the oil ink prepared by dissolving the anthraquinone dye of the present invention using xylene (specific dielectric constant: 2.3) as the solvent, there may be the case where the specific dielectric constant is largely changed by about 20% as compared with the case of only xylene, and the drive characteristic is adversely influenced.

While the invention has been described in detail and with reference to specific embodiments thereof, it will be apparent to one skilled in the art that various changes and modifications can be made therein without departing from the spirit and scope thereof. The present application is based on a Japanese patent application filed on Mar. 9, 2010 (Japanese Patent Application No. 2010-051815), the entirety of which is incorporated herein by reference in its entirety.

INDUSTRIAL APPLICABILITY

The ink and anthraquinone based dye of the present invention can be especially suitably used for, for example, displays and optical shutter, in particular electrowetting displays such as electronic papers, etc.

The invention claimed is:

1. An ink comprising an anthraquinone based dye represented by the following general formula (I) and a low polar solvent:

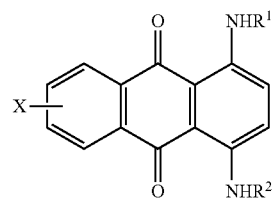

wherein X represents a $COOR^3$ group; and each of $R^1$ to $R^3$ independently represents an optionally substituted alkyl group having a carbon number of from 1 to 20, provided that at least one of $R^1$ to $R^3$ is an optionally substituted branched-chain alkyl group having a carbon number of from 4 to 20, and the anthraquinone ring may have an arbitrary substituent other than X, $NHR^1$, and $NHR^2$.

2. The ink according to claim 1, wherein the low polar solvent has a specific dielectric constant of not more than 2.2.

3. The ink according to claim 1, wherein the low polar solvent includes one or more members selected from the group consisting of hydrocarbon based solvents, fluorocarbon based solvents, and silicone oils.

4. The ink according to claim 1, wherein the anthraquinone based dye is a dye represented by the following general formula (II):

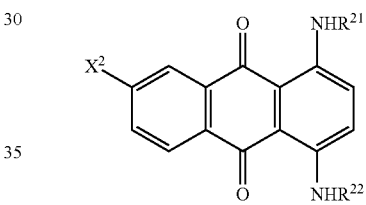

wherein $X^2$ represents $COOR^{23}$; each of $R^{21}$ and $R^{22}$ independently represents an optionally substituted branched-chain alkyl group having a carbon number of from 4 to 20; and $R^{23}$ represents an optionally substituted alkyl group having a carbon number of from 1 to 20.

5. The ink according to claim 1, wherein in the anthraquinone based dye, when the dye is dissolved in n-decane, an absorption maximum wavelength in a wavelength region of from 350 to 750 nm falls within the range of from 600 to 720 nm, and a product $\epsilon C$ of a molar absorption coefficient $\epsilon$ (L mole$^{-1}$ cm$^{-1}$) at the absorption maximum wavelength and a concentration C (mole L$^{-1}$) of a saturated solution with the same solvent at room temperature (25° C.) is 500 (cm$^{-1}$) or more.

6. The ink according to claim 1, which is for a display or optical shutter.

7. The ink according to claim 1, wherein a viscosity of the low polar solvent is 1.0 cP or more and 10.00 cP or less at 30° C.

8. The ink according to claim 1, wherein a surface tension of the low polar solvent is 5 mN·m$^{-1}$ or more and 50 mN·m$^{-1}$ or less.

9. A display, which comprises a display portion containing the ink according to claim 1, and which displays an image by controlling voltage impression in the display portion.

10. The display according to claim 9, wherein the display portion contains electrophoretic particles or an aqueous medium.

11. The display according to claim 9, wherein the image is displayed by changing a colored state by the voltage impression.

12. The display according to claim 9, wherein the image is displayed by an electrowetting system or an electrophoresis system.

13. An electronic paper comprising the display according to claim 9.

* * * * *